US012694406B2

(12) United States Patent
Zhu et al.

(10) Patent No.: US 12,694,406 B2
(45) Date of Patent: Jul. 28, 2026

(54) SYSTEMS AND METHODS FOR MACHINE LEARNING USING ADVERSARIAL LEARNING AND DATA TRANSFORMATION

(71) Applicant: HSBC Software Development (Guandong) Limited, Guangzhou (CN)

(72) Inventors: Bing Zhu, Shanghai (CN); Ziyuan Li, Guangzhou (CN); Yong Xia, Guangzhou (CN); Runjun Jiang, Shanghai (CN); Yifan Yan, Shanghai (CN); Quanzhou Xiang, Shanghai (CN)

(73) Assignee: HSBC Software Development (Guandong) Limited, Guangzhou (CN)

( * ) Notice: Subject to any disclaimer, the term of this patent is extended or adjusted under 35 U.S.C. 154(b) by 0 days.

(21) Appl. No.: 18/812,894

(22) Filed: Aug. 22, 2024

(65) Prior Publication Data

US 2024/0412221 A1     Dec. 12, 2024

(51) Int. Cl.
| | |
|---|---|
| *G06Q 20/40* | (2012.01) |
| *G06N 3/084* | (2023.01) |
| *G06N 3/094* | (2023.01) |
| *G06Q 20/38* | (2012.01) |
| *G06Q 40/03* | (2023.01) |

(52) U.S. Cl.
CPC ......... *G06Q 20/4016* (2013.01); *G06N 3/084* (2013.01); *G06N 3/094* (2023.01); *G06Q 20/388* (2013.01); *G06Q 40/03251* (2025.08)

(58) Field of Classification Search
CPC .. G06Q 20/4016; G06Q 20/388; G06Q 20/34; G06Q 40/03251; G06N 3/045; G06N 3/047; G06N 20/00; G06N 3/084; G06N 3/094
See application file for complete search history.

(56) References Cited

U.S. PATENT DOCUMENTS

| | | | | |
|---|---|---|---|---|
| 2014/0058763 A1* | 2/2014 | Zizzamia | ............... | G06Q 10/10 705/4 |
| 2021/0233082 A1* | 7/2021 | Gagpalliwar | .......... | G06N 20/20 |
| 2021/0326664 A1* | 10/2021 | Dasgupta | ............... | G06N 20/20 |
| 2023/0186311 A1* | 6/2023 | Vimal | ............... | G06Q 20/4016 |
| 2023/0206241 A1* | 6/2023 | Kayathwal | ........... | G06Q 20/065 705/75 |

* cited by examiner

*Primary Examiner* — Eric T Wong
(74) *Attorney, Agent, or Firm* — Dentons Durham Jones Pinegar

(57) ABSTRACT

A machine learning hardening system and method for hardening machine learning models against adversarial attacks are disclosed, addressing the prevalent challenges of data imbalance and sophisticated adversarial attacks. The method involves preprocessing data for logistic regression, and augmenting the dataset with synthetic fraudulent transactions generated by a Negative-Calibrated Generative Adversarial Network (NCGAN) to ensure balance. Adversarial behavior is modeled to simulate fraudster responses to detection models, employing a Stackelberg game framework. A logistic regression model is trained using a sum of top-K loss function to focus on the transactions with the greatest loss, enhancing the detection of fraudulent activity.

20 Claims, 13 Drawing Sheets

Fraudulent
feature

Fraudsters Manipulation

Fraudsters Manipulation
Modeler

AUC Score of Test Set 1

901

AUC Score of Test Set 2

AUC Score of Test Set 3

SYSTEMS AND METHODS FOR MACHINE LEARNING USING ADVERSARIAL LEARNING AND DATA TRANSFORMATION

FIELD

The present disclosure relates to computer implemented systems and methods for improving robustness of machine learning models against cyberattacks by malicious actors, in particular, machine learning hardening techniques that incorporate adversarial learning and data augmentation (e.g., using a negative-calibrated generative adversarial network) to provide approaches for logistic regression to address data imbalance and adaptive malicious behaviors using a sum of top-K loss based machine learning mechanism.

INTRODUCTION

Machine learning approaches have technical weaknesses, as certain machine learning mechanisms have blind spots relating to features that can be manipulated by malicious actors. Accordingly, it is desirable to improve the robustness of classification under imbalanced data, and improved approaches are proposed herein.

As described herein, issues arise in relation to the imbalance of data sets, and trained machine learning models can become vulnerable to certain types of attacks, where vulnerability can be exploited by malicious actors, such as fraudsters, to cause the machine learning model to generate erroneous outputs. These erroneous outputs can then be used as cybersecurity exploits or other types of exploits whereby enterprise computing infrastructure may be put at risk.

This is a technical vulnerability that arises due to the error term between the ground truth and the decision boundary represented in the latent model as trained in a data structure having adjustable parameter weights.

Accordingly, approaches to improve the robustness of computerized machine learning determinations is desirable.

SUMMARY

Machine learning computer programming techniques have become a natural choice for fraud detection, given their ability to identify and extract information from large amounts of data without explicit programming. However, credit card fraud detection is a challenging problem due to imbalanced data and adversarial attacks, which lead to cybersecurity vulnerabilities that can be exploited by coordinated attacks from a sophisticated cyber actor agent. Essentially, this cyber actor agent can employ their own adversary model trained using probed samples for generation of attacks that represent sequences of data functions or inputs that are adapted to cause misclassifications by exploiting the error range between the decision boundary and the ground truth.

A computer implemented system specially configured for providing a cybersecurity countermeasure is proposed herein, adapted to provide a practical implementation that can be implemented in respect of real-world applied use cases. As noted herein, the actions and counteractions from a cybersecurity perspective can be modelled as a Stackelberg equilibrium problem, creating a race condition between cyberattackers and cyberdefenders. Recognizing the practical limitations of finite computing power and requirements for a dynamic ground truth, an objective herein is to provide a practical solution that can be used as a mechanism to proactively harden machine learning models, such as models that generate classifications. By proactively taking hardening steps, the models become less vulnerable to certain types of cyberattacks as described herein, while also maintaining the ability to be flexible to periodic or continuous training. A specific technical problem is also described in relation to a practical dataset situation that leads to cybersecurity weaknesses where the only available datasets for training are highly imbalanced.

In highly imbalanced data, most of the negative samples are far from the decision boundary, resulting in very small losses. The number of negative samples can far exceed that of positive samples, making it challenging for a machine learning model to achieve meaningful accuracy. Another challenge in detecting credit card fraud is adversarial attacks, where fraudsters manipulate their feature distribution to evade the detection of machine learning algorithms. This could be done by directly disguising positive samples in the test set or even attempting to reverse engineer the model parameters. The fraudster then utilizes the newly-gained insight to modify their future tactics and maximize their gains.

The application of various statistical, machine learning, and deep learning techniques, including decision trees (DT), support vector machines (SVM), logistic regression, KNN and other models, have failed to address these challenges.

Applicants propose using a Negative-Calibrated Generative Adversarial Network (NCGAN) to address the data imbalance. NCGAN is a model data architecture designed to generate synthetic data that closely resembles real data. It operates in a game-like scenario where a generator tries to produce synthetic data that a discriminator classifies as real. The discriminator, on the other hand, learns from the most recent synthetic data to improve its classification accuracy. The NCGAN can be implemented in the form of a specially configured computer system that electronically couples to machine learning models to generate the synthetic data and conduct retraining, for example, across a message bus. The NCGAN can be a server or a specially configured computer in a data center that is specially configured for machine learning hardening by taking naïve models and periodically hardening them. A machine learning model supervisor system controls the operation of the NCGAN and hardening activities, and in some embodiments, can monitor the performance of the NCGAN in view of success or failure against suspected or actual cybersecurity breaches. For example, the NCGAN can be operated against a stable of models on coupled computing systems to periodically harden them by conducting a NCGAN retraining process, for example, on a weekly basis. The retraining can be conducted during off hours during reduced computing load to take advantage of more computing resources or consolidated data sets for retraining.

The NCGAN is configured to introduce a penalty term to the standard Generative Adversarial Network (GAN) for synthetic positive data that appears more like real negative data to aid in the training of the machine learning models. This is a key feature of NCGAN and differentiates it from traditional GANs which may generate synthetic data that resembles negative data more than positive data, especially on the decision boundary. This could result in a flawed decision boundary from the subsequent logistic regression. The NCGAN is a technical approach that provides technical improvements over other types of GAN approaches.

Applicants additionally propose an adversarial learning with sum of top-K loss (AST) framework to further address the data imbalance in an adversarial setting, which can be combined with the NCGAN approach in a practical implementation, where the two approaches operate in concert to reduce cybersecurity vulnerabilities for specific types of machine learning models that have class imbalances. Adversarial learning estimates the reaction of fraudsters and trains the model accordingly with adversarial adjusted data. This novel approach integrates adversarial learning into logistic regression to mitigate the blind spots of traditional machine learning methods, which are vulnerable to fraudsters manipulating features to evade detection. The sum of top-K loss further alleviates data imbalance problems by replacing the plain empirical loss which fails to effectively address datasets with large numbers of unimportant data points.

Moreover, the proposed system is directed to a gradient descent approach to optimize the adversarial logistic regression model with the sum of top-K loss. With a dedicated combination of these components, the resulting approach and corresponding specially configured computer system is versatile and robust in fraud detection tasks.

The adversarial learning process can be modeled as a Stackelberg game in which the iterative process continues as the fraudsters and the FI adapt and counter-adapt, aiming to reach a Stackelberg equilibrium. In this equilibrium, the FI's fraud detection model becomes more effective, and the fraudsters' strategies become less successful.

Practical experiments conducted by Applicants have validated the effectiveness of certain embodiments of the proposed framework over the alternate machine learning techniques.

BRIEF DESCRIPTION OF THE DRAWINGS

In order to facilitate a fuller understanding of the present invention, reference is now made to the attached drawings. The drawings should not be construed as limiting the embodiments, but are intended only to illustrate different aspects and embodiments.

Exemplary embodiments will now be described in order to illustrate various features of the invention. The embodiments described herein are not intended to be limiting as to the scope of the embodiments, but rather are intended to provide examples of the components, use, and operation of the embodiments. Furthermore, the described features and advantages of the embodiments may be combined in any suitable manner. One skilled in the art will recognize that the embodiments may be practiced without one or more of the features or advantages of an embodiment, and one skilled in the art will recognize the features or advantages of an embodiment can be interchangeably combined with the features and advantages of any other embodiments. In other instances, additional features and advantages may be recognized in certain embodiments that may not be present in all embodiments.

DETAILED DESCRIPTION

Figure 1:
FIG. 1 is a block diagram illustrating a fraud detection system, according to some embodiments.
Figure 1:
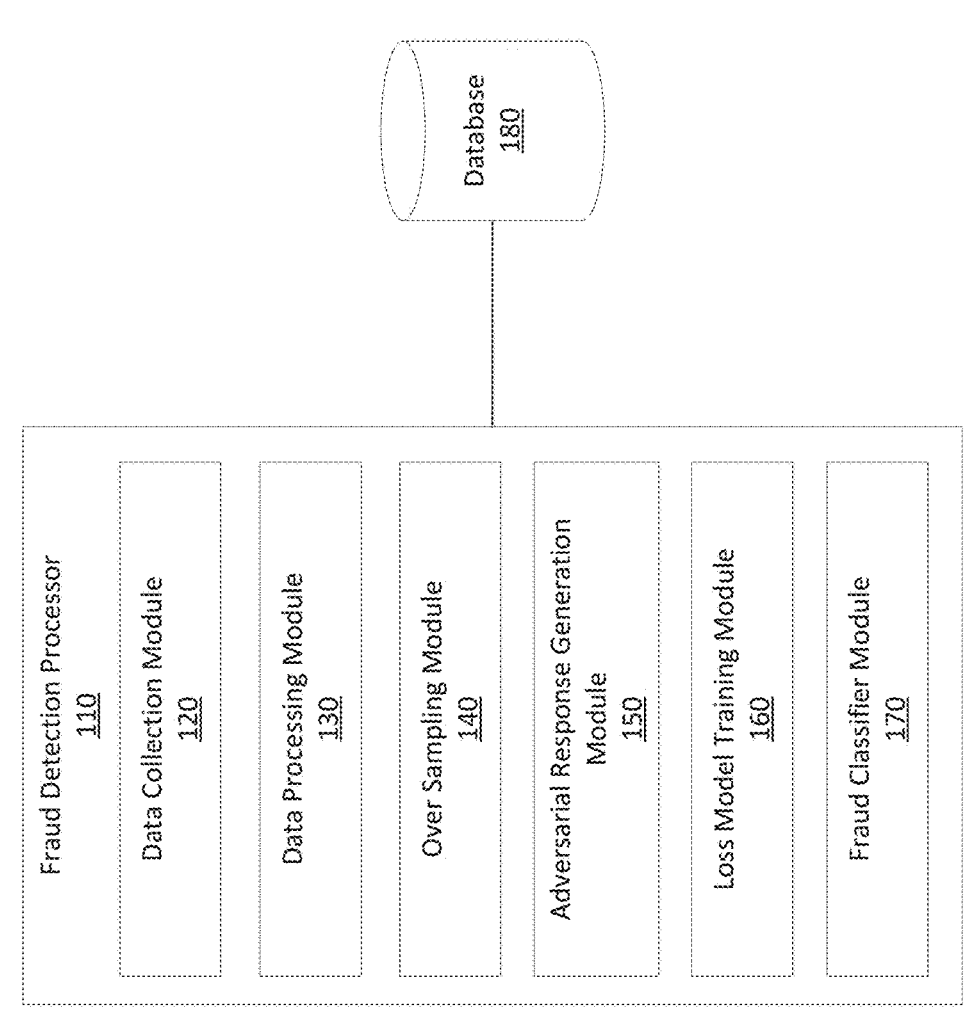

Machine learning is a computational approach using specifically trained data model representations, where a computational architecture maintains a representation that is iteratively tuned. The representation can be reflected as a "latent space" in the form of a tuned data structure storing parametric variables. This tuning causes the representation to shift, for example, with an objective to more closely reflect an underlying decision boundary that, without explicit programming, is a property of the input data sets that are used for training. Input data sets can be split into those in the training set during a training period and those in a test set, the test set being used during an inference period in operation to classify data elements in the test set using the trained model.

A benefit of machine learning is that the latent space representation can adapt to handle highly non-linear relationships through the training process, but the training process is not infallible as there will be a gap between the latent space and the true decision boundary. A drawback of machine learning is that it is difficult to troubleshoot the latent space representation, and this difficulty provides a cybersecurity attack vector for malicious users, such as fraudsters, who may be operating their own fraudster machine learning systems in an effort to create an adversarial system that tracks the machine learning system and generates outputs that control operation of fraudster activities to cause the machine learning system to yield misclassifications.

An assumption of machine learning is that the training set and the test set share the same underlying distribution (e.g., having balance between labels). However, in real-world applications, this assumption may not always hold true, as there can be a significant imbalance in distribution. The detecting party needs to confront the challenges of adversarial learning. In an example, a computerized machine learning model can be used as a fraud identification model, which when operating, can be used to generate classification outputs indicative of "fraud" or "not fraud". As described herein, a specific technical solution is proposed that addresses a practical problem that arises in the applied scenario where the training dataset has a label imbalance, and where the test set may not have the same distribution.

The proposed approach is used to harden an initial machine learning model data representation in an effort to reconfigure or otherwise transform the machine learning model data representation into a hardened version (e.g., with updated parameters) to make it less vulnerable from a cybersecurity perspective against an adversary (e.g., fraudster) who is monitoring (e.g., observing by generating probes) the model and taking measures to actively try to fool the system. Accordingly, the proposed approach provides a technical countermeasure that can be practically applied to harden a model so that it is less vulnerable to adversarial attack. In some embodiments, a combination approach of different computational modifications are integrated together to provide a practical solution, and experiments are noted below to validate example variations of the proposed practical solution. As noted herein, the approaches proposed below will have additional computational cost in terms of complexity as additional technical steps and transformations are required, but Applicants submit that the hardening approaches are technically useful in reducing cybersecurity vulnerabilities, especially against more sophisticated threat actors who are actively running their own adversary systems to generate sophisticated attacks where they utilize intentional perturbations targeted to make the machine learning model generate false classifications.

Foundational or applied models can be used in the above classifications, and in some embodiments, the architectures of the models and data set inputs may be available. There may be a limited number of model options, and because there can be a limited number of model options, the attacker may be able to effectively guess which model type is being used.

In this guessing approach, an attacker may send testing/probing data (e.g., sample questions) to models and observe response data sets, and estimate the model architecture, essentially obtaining training data in real life. Once enough training data is available, a similar model can be reproduced using the accumulated information. Question and response pairs can be used to estimate aspects of the model for attack. While a model may not be reproducible in full, a sufficient amount of the model may be identified, and in some embodiments, an adversary model is being trained using the outputs of the machine learning model. Once trained, the adversary model can then be used to generate specific perturbations that can yield a classification error. This classification error can then be exploited by the attacker, for example, in having truly fraudulent transactions misclassified as non-fraudulent.

The attacker will speculate the fraud identification model and modify the test data being provided so that positive samples can evade the recognition of machine learning algorithms. Once a fraud identification model is studied in this manner, it can become vulnerable to attacks. As the attacker has learned the model, and how it classifies, the attacker can attempt to provide samples to probe rules (e.g., large volume transactions at late night) and to subsequently fool the pattern recognition capabilities of a model based on the probing results. In a simplified example for illustration purposes, a pattern of non-fraudulent large volume transactions can be utilized and then a false transaction can be used to mislead the model to yield an incorrect classification. The attacker can be a sophisticated, automated agent, such as a competing computer system under the control by a malicious user. The competing computer system can be configured to learn the fraud identification model using the samples, and to send/generate misleading information to the fraud detection system.

Directly disguising positive samples in the test set, called adversarial attack, is a practical approach. This is a technical deficiency that is exploited by fraudulent agents. By disguising the positive samples, the fraudulent agent is able to exploit various cybersecurity vectors, causing erroneous outputs to occur.

Activities between fraudsters and data miners can be modeled using game theory, which includes two types of games: a Nash game and a Stackelberg game. In the Nash game, the attackers and data miners act simultaneously. Researchers have investigated the existence of Nash equilibrium in adversarial learning, proposing the Nash Logistic Regression and Nash SVM models and demonstrated in empirical experiments that adversarial learning models outperformed traditional machine learning models.

In Stackelberg games, the fraudsters and data miners act sequentially, and this can be formulated as a bilevel pro-gram. While a genetic programming-based approach can be used to solve it, others have focused on enhancing the feature selection of the classifier, or have explored the equilibrium and solved the equilibrium via the stationary condition.

In real-world applications, the inner workings of a machine learning model are a black box to attackers, and thus the exact model parameters are not known. Instead of explicitly manipulating features, a mixture Gaussian model can be utilized to model the features of positive samples. However, in the discussion herein, an assumption is made that a malicious party or agent is aware of the model parameters. This is a reasonable assumption as Adversarial Classifier Reverse Engineering (ACRE) approaches have shown that linear model parameters can be reverse engineered through a polynomial number of queries.

The technical objective is to harden a machine learning model (e.g., a trained machine learning data architecture) to address issues associated with adversarial attacks and data imbalance. Effectively, the model becomes less vulnerable to these types of attacks through reconfiguration. From a practical perspective, an initial model is provided (e.g., with initial parameters), and the model can be reconfigured as described herein to yield an output hardened model.

A novel machine learning architecture denoted as "AST" is described herein in various embodiments. AST stands for the Adversarial Learning with Sum Top-K loss (AST) framework. This framework addresses the challenges of imbalanced data and adversarial attacks in credit card fraud detection. AST combines adversarial learning with logistic regression and sum of top-Kloss. Adversarial learning is used to estimate the reaction of fraudsters and train the model with adversarial adjusted data, which helps in overcoming the blind spots of traditional machine learning methods that could be manipulated by fraudsters to evade detection.

On the other hand, the sum of top-K loss is a technique designed specifically to handle imbalanced data. Instead of minimizing the sum of all losses, this technique focuses on the largest K losses, which are usually associated with difficult-to-classify samples. In highly imbalanced data, most of the negative samples (non-fraudulent transactions) are far from the decision boundary, resulting in very small losses. The accumulated loss from many unimportant samples could easily misguide the model. Addressing this issue, the sum of top-K loss prevents the model from being dominated by these unimportant samples and focuses the model on the critical samples that need more attention instead. This in turn helps improve the robustness of classification under imbalanced data.

The combination of adversarial learning and sum of top-K loss in the AST framework results in a model that is robust and effective in detecting credit card fraud. This effect is validated by numerical experiments.

In a further embodiment, an optimized version of the AST framework is described by gradient descent, wherein adversarial learning can be deemed as a self-adaptive $l2$ regularization for positive samples.

A proposed machine learning approach introduces a sum of top-K loss to further improve the robustness of classification under imbalanced data for replacing the plain empirical loss. The proposed system is directed to a gradient descent approach to optimize the adversarial logistic regression model with the sum of top-K loss. Experiments conducted by Applicants have validated the effectiveness of certain embodiments of the AST framework over the alternate machine learning techniques and adversarial learning algorithms.

In the adversarial learning, $X_-$ is defined as the index set of features for negative samples, while $X_+$ refers to the corresponding set for an index of positive samples. The labels, represented by the symbol $y_k$, for $X_-$ and $X_+$, are designated as −1 and 1, respectively.

The size of these two sets is denoted as $|X_-|$ and $|X_+|$. Furthermore, k is the index in the two sets, and the feature vector for these sets is represented by the symbol $x_{k-} \in \mathbb{R}^m$ or $x_{k+} \in \mathbb{R}^m$. The logistic model parameter is $\omega \in \mathbb{R}^m$.

Applicants assume that malicious actors will attempt to adjust their features based on the parameters (i.e., w) of the logistic regression model. As there are a limited number of model options for the model designer to choose from, the malicious actors may be able to estimate the model architecture and adjust their features based on their probed estimation of the model architecture. Specifically, these malicious actors aim to obtain a lower activation value in the model while minimizing the deviation from their original features. Furthermore, they might use adversarial attacks, where they manipulate their feature distribution to evade the detection of machine learning algorithms. This could be done by directly disguising positive samples in the test set. In some cases, they may even attempt to reverse engineer the model parameters.

$$\dot{x}_k = \operatorname{argmin}\ w^T \dot{x}_k + \frac{C}{2} \|\dot{x}_k - x_{k+}\|^2, \forall\, k \in X_+. \quad (1)$$

Here, the parameter C represents the penalty for altering the distribution of malicious actor data. The closed-form solution for the update of the feature vector of the malicious actor data is given by:

$$\dot{x}_k = x_{k+} - \frac{1}{C} w \quad (2)$$

Applicants model the game between the fraudsters and data miner as a Stackelberg game. A Stackelberg game is defined as a sequential game where players are divided into leaders and followers. Leaders make the first move to maximize their profits, and followers respond accordingly to maximize their own profits. It is a sequential game in that once the logistic model is established, the fraudsters reacts to the model weight as equation (1).

The Stackelberg equilibrium is reached when, considering the manipulation of fraudsters, the data miner has achieved the lowest logistic regression loss. This equilibrium is:

$$\min_{w,\dot{x}} \sum_{k \in X_+ \cup X_-} \log\left(1 + \exp\left(-w^T \dot{x}_k y_k\right)\right) \quad (3)$$

$$\text{s.t. } \dot{x}_k = x_{k+} - \frac{1}{C} w,\ \forall\, k \in X_+,\ \dot{x}_k = x_{k-},\ \forall\, k \in X_-.$$

Recall the labels, represented by the symbol $y_k$, for $X_-$ and $X_+$, are designated as −1 and 1, respectively. Thus the equilibrium is:

$$\min_{w} \sum_{k \in X_-} \log\left(1 + \exp\left(w^T x_{k-}\right)\right) + \sum_{k \in X_+} \log\left(1 + \exp\left(-w^T\left(x_{k+} - \frac{1}{C} w\right)\right)\right). \quad (4)$$

The Stackelberg equilibrium is important in the context of adversarial learning and game theory since it allows for the modeling of the sequential actions of fraudsters and data miners in real-world applications. This capability makes it a valuable tool for situations where one party, in this case, the data miner, needs to anticipate and react to the actions of another party, the fraudster.

The Stackelberg equilibrium can be used in machine learning to optimize the parameters of a logistic regression model. In this context, the leader can be considered as the training process of the model, which first sets the parameter values. The followers can be considered as the validation process, which adjusts the parameter values based on the validation error.

The Stackelberg equilibrium's sequential decision-making process ensures the lowest logistic regression loss. The leader's initial decision provides a direction for the optimization, and the followers' decisions adjust this direction based on the observed errors. This sequential optimization process can avoid the optimization process getting stuck in local minimums of the loss function, which is a common problem in machine learning.

Moreover, the Stackelberg equilibrium also involves a form of anticipation—the leader anticipates the reactions of the followers when making its decision. This anticipation can guide the optimization towards the global minimum of the loss function.

A sum of top-K loss is introduced herein as a proposed approach to improve the system's robustness to handle imbalanced data. The technical objective for the sum of top-K loss approach is to prioritize the most challenging samples for classification by focusing on the largest losses, which are associated with the difficult-to-classify samples. This is particularly relevant in scenarios where there is a significant class imbalance within the data. In such cases, most of the negative samples may be located far from the decision boundary, resulting in very small losses. The presence of numerous unimportant samples can lead to a cumulative effect that misguides the model.

In the field of fraud detection, datasets could consist of millions of credit card transactions, of which the vast majority would be legitimate, while a small fraction would be fraudulent. The negative samples (legitimate transactions) are likely to be far away from the decision boundary, resulting in minimal losses. However, if the model gives equal importance to all negative samples, it may end up focusing more on correctly classifying the majority class (legitimate transactions) rather than the critical minority class (fraudulent transactions). By applying the sum of top-K loss approach, the model can prioritize the most challenging and critical samples, such as those closer to the decision boundary, leading to more effective fraud detection.

Another example where the sum of top-K loss approach is beneficial is in object detection tasks. In a dataset containing images with multiple objects, the majority of the image regions (negative samples) might not contain any objects of interest. These negative samples, which are far from the decision boundary, would contribute only minimal losses individually. However, if the model assigns equal importance to all negative samples, it might detrimentally focus more on correctly classifying the background rather than accurately detecting the objects of interest. By utilizing the sum of top-K loss approach, the model can prioritize the difficult-to-classify samples, such as those regions near the decision boundary, ensuring that the model focuses on the critical samples that require more attention.

The sum of top-K loss prevents the model from being dominated by these unimportant samples and focuses on the critical samples that need more attention. Combining the sum of top-K loss with adversarial learning is proposed herein.

First, the following is defined:

$$l_k^-(w) = \log\left(1 + \exp\left(w^T x_{k-}\right)\right), k \in \mathcal{X}_-, \tag{5}$$

$$l_k^+(w) = \log\left(1 + \exp\left(-w^T\left(x_k + \frac{1}{C}w\right)\right)\right), k \in \mathcal{X}_+, L = \{l_k^-(w)\} \cup \{l_k^+(w)\}.$$

Instead of minimizing the sum of all the elements in L, the approach instead minimizes the sum of the largest K elements in L, which is:

$$l_{[1]} + l_{[2]} + \dots + l_{[K]}, \tag{6}$$

Where $l_{[i]}$ denotes the i-th largest value of L.

In practice, the direct identification of the K largest losses in equation (6) is difficult. Applicants incorporate the identification of the K largest losses into the gradient descent method by introducing the parameter $\lambda$ to ensure that the K largest losses are considered when minimizing L with respect to $\lambda$. The resulting reformulation is:

$$\min_{\lambda \geq 0, w} L(w, \lambda) = \sum_{i=1}^{|L|} (l_i(w) - \lambda)_+ + K\lambda, \tag{7}$$

Where $(\cdot)_+$ denotes max $(\cdot, 0)$. Equation (7) then becomes:

$$L(w, \lambda) = \sum_{k \in \mathcal{X}_-} (l_k^-(\omega) - \lambda)_+ + \sum_{k \in \mathcal{X}_+} (l_k^+(w) - \lambda)_+ + K\lambda. \tag{8}$$

Gradient descent is used to solve the optimization problem presented in equation (8).

$$w^{t+1} = w^t - \beta^t \frac{\partial L(w^t, \lambda^t)}{\partial w^t}, \tag{9}$$

$$\lambda^{t+1} = \left(\lambda^t - \beta^t \left(K - \sum_{i=1}^{|L|} \mathbb{1}_{[l_i(w^t) > \lambda^t]}\right)\right)_+, \tag{10}$$

Where $$\frac{\partial L(\omega^t, \lambda^t)}{\partial \omega^t}$$

equals to:

$$\sum_{k \in \mathcal{X}_-} \frac{\partial l_k^-(w^t)}{\partial w^t} \cdot \mathbb{1}_{[l_k^-(w^t) > \lambda^t]} + \sum_{k \in \mathcal{X}_+} \frac{\partial l_k^+(w^t)}{\partial w^t} \cdot \mathbb{1}_{[l_k^+(w^t) > \lambda^t]}. \tag{11}$$

The full-batch gradient descent can be adapted to stochastic gradient descent, making it scalable for large datasets. The full-batch gradient descent algorithm computes the gradient of all losses in a dataset, which can be computationally expensive and inefficient for large datasets. To address this issue, stochastic gradient descent (SGD) can be used as an alternative. In SGD, instead of computing the gradient of all losses, a random subset of samples, typically referred to as a mini-batch, is used to estimate the gradient. This in turn lowers the computational complexity and allows the algorithm to be much more efficient for large datasets.

The efficiency of SGD can be additionally improved by employing the top-K losses method, namely focusing on the most influential or challenging samples, rather than considering all samples in the mini-batch.

The stability and performance of the optimization process can be further improved by the joint convexity of the loss function in equation (8) with respect to both the model parameter w and the parameter $\lambda$. One can randomly sample $$l_k^+ \text{ or } l_k^-$$

instead of determining the gradients of all losses. This joint convexity property ensures that the loss function has a unique global minimum, making the optimization process more stable and predictable. Moreover, this property enables theoretical guarantees for the convergence rates of SGD. Specifically, when the learning rate $\beta^t$ is proportional to $$\frac{1}{\sqrt{t}},$$

where t denotes the number or iterations, SGD can achieve convergence rates of $$O\left(\frac{1}{\sqrt{t}}\right)$$

for stochastic gradient descent. This convergence rate means that as the number of iterations increases, the convergence of the algorithm becomes faster, leading to more efficient optimization.

The explicit formula of $$\frac{\partial l_k^+(\omega^t)}{\partial \omega^t}$$

is:

$$-\text{sigmoid}\left(-\left(x_{k+} - \frac{1}{C}w^t\right)^T w^t\right) \cdot x_{k+} + \tag{12}$$

$$\frac{2}{C}\,\text{sigmoid}\left(-\left(x_{k+} - \frac{1}{C}w^t\right)^T w^t\right) \cdot w^t,$$

where $$\text{sigmoid}(z) = \frac{1}{(1 + e^{-z})}.$$

The latter term in equation (12) can be deemed as a form of self-adaptive l2 regularization for the parameter vector $\omega$, with the l2 regularization term equaling $$\frac{2}{c} \text{sigmoid}\left(-x_{k+} - \frac{1}{c} \cdot \omega^i\right)^T \omega^i\Bigg).$$

Aside from the sum of top-K loss, the implicit self-adaptive I2 regularization is the Applicants' proposed approach to mitigate the challenge of data imbalance. The model could adapt its regularization term based on the imbalance in the dataset, addressing the bias towards the majority class. The adaptation process involves calculating class weights based on the data imbalance and adjusting the regularization term accordingly. The class weights can be calculated using techniques like inverse class frequency, inverse square root class frequency, or any other method suitable for the problem. Subsequently, the regularization term is adjusted by multiplying the normal I2 regularization with the class weight for each class.

In practice, once the adversary has adjusted its feature distribution based on the model, the model can correctly classify the ground truth label, and the smaller I2 regularization the model will impose on the sample. Conversely, if the adversarial adjusted positive samples are located near or even across the decision boundary, the model will impose a larger regularization. This allows the model to be less sensitive to positive outliers.

In one iteration of full batch gradient descent traversing all samples in one epoch of stochastic descent for optimizing the AST framework, the complexity mainly consists of the inner product of the feature vector X and the parameter vector $\omega$. If $n=|X_-|+|X_+|$, then the time complexity of determining the gradients of all samples is $O(nk)$.

A proposed practical implementation is described below. In this practical example, a system is proposed as an applied system for conducting fraud processing using the machine learning approaches described herein. A practical application of this example could include a specific special purpose machine or server appliance that resides within a physical data center or data facility and is coupled to a message bus through an application programming interface (API). The system can be invoked or otherwise interacted with by other computer systems through the API, and the interactions can include function calls to the system to conduct a hardening operation against an initial machine learning model that is not hardened to attack. Variations of the approach described herein can be then utilized to conduct a machine learning parameter transformation of the initial machine learning model to re-configure the latent space, essentially updating the parameters stored in the underlying data structure to reduce a cybersecurity vulnerability attack space. The output of the system can include an updated latent space that is hardened to attack, which can be output in the form of an output data structure that can be made available on the API for replacing a latent space of an existing model being hosted or operated by another computing system. The hosting computing system can then operate an updated hardened variant of the machine learning model, reducing vulnerability to attack by sophisticated fraudsters.

Accordingly, the system described herein, in this practical embodiment, can be configured as a special purpose machine that automatically conducts machine learning model hardening. The system can be designated for use, for example, when a data set monitoring data process (e.g., a daemon process) identifies an imbalance in training or test data sets, indicating that a particular model may be more vulnerable to adversarial attacks or that the model may be a candidate for the specific hardening approaches described herein.

A non-limiting, specific applied use case of the system is an applied machine learning system for detecting fraud, such as credit card fraud, as credit card fraud constitutes a substantial proportion of all financial frauds, causing significant economic losses and social risks globally. Financial fraud is a pervasive problem in contemporary society, involving the use of deceitful practices to obtain illicit benefits. Such practices not only jeopardize the impartiality and transparency of financial markets but also pose significant economic losses and social risks for investors, financial institutions, governments, and society at large. With the intricate and diverse nature of financial markets, fraudulent activities have become more sophisticated and harder to detect, leading to an increasing prevalence of financial fraud. Credit card fraud, in particular, constitutes a substantial proportion of all financial frauds, causing significant economic losses and social risks globally.

To address the challenge of detecting credit card fraud, machine learning techniques are useful, given their ability to identify and extract information from large amounts of data. Different approaches include the application of various statistical, machine learning, and deep learning techniques, including decision trees (DT), support vector machines (SVM), logistic regression, KNN and other models. In recent years, deep learning-based algorithms have emerged as promising solutions to credit card fraud detection. For such tabular data classification problem, the TabNet has become the state-of-the-art algorithm.

One of the major challenges in credit card fraud detection is dealing with imbalanced data. The number of negative samples (i.e. fraudulent transactions) can far exceed that of positive samples (e.g. valid or non-fraudulent transactions), making it challenging for a machine learning model to achieve meaningful accuracy. Aside from oversampling techniques, in the proposed approach below, the sum of top-K loss is applied for usage in relation to machine learning for fraud detection. Such loss is tailored to address technical deficiencies relating to data imbalance issues. Another challenge in detecting credit card fraud is adversarial attacks, where fraudsters manipulate their feature distribution to evade the detection of machine learning algorithms.

Accordingly, adversarial learning has emerged as a promising solution to address this challenge. The objective of adversarial learning is to estimate the reaction of fraudsters and train the model accordingly with adversarial adjusted data. As described above, a proposed approach is to propose adversarial learning with Sum Top-K loss (AST) framework to address these two challenges. The framework combines an adversarial learning-based logistic regression with sum of top-K loss. The logistic regression classifier is preferred by finance institutes for its explanatory ability. This framework allows for an improved machine learning data approach to be applied to conduct a specific hardening transformation that provides a practical solution to address technical deficiencies that could potentially be exploited by sophisticated adversary computer systems under the control of fraudsters.

The sum of top-K loss is a powerful tool to further alleviate data imbalance problems. With a dedicated combination of these two components, the approach is versatile and robust in credit fraud detection tasks. Numerical experimental results demonstrate the effectiveness and robustness of our AST framework. Approaches described herein can be applied to hardening machine learning, and fraud detection is provided as a non-limiting, illustrative example.

Corresponding systems, methods, processes, and computer program products (non-transitory computer readable media) are described below. The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

FIG. 1 is a block diagram illustrating a system 100 according to an example embodiment. The system 100 can include a fraud detection processor 110 and a database 180. The fraud detection processor 110 itself includes a data collection module 120, data processing module 130, over sampling module 140, adversarial response generation module 150, loss model training module 160, and a fraud classifier module 170. These modules may be collections of code or instructions stored on a media that represent a series of machine instructions that implement one or more actions explained below. Each of these modules can be stored within a memory or data storage unit associated with the fraud detection processor 110.

These modules can be configured to obtain and preprocess data, augment the data, model the behavior of fraudsters, train a model with the data, and classify fraudulent data from non-fraudulent ones. The system 100 can also include a database 180 electronically connected to the fraud detection processor 110 over a wired or wireless network.

The data collection module 120 can obtain and preprocess one or more transaction data associated with one or more user accounts. The transaction data can include credit card transactions, debit card transactions, and other transactions associated with exchanging payment. These transactions may be associated with user accounts including checking, savings, and credit accounts.

As a nonlimiting example, the transaction data can include one or more fraudulent transactions and one or more non-fraudulent or valid transactions. In some embodiments, the transaction data may be associated with only one user or, in other embodiments, many other users. In still other embodiments, the transaction data may be associated with a certain category of user by age, sex, income level, past transaction history, geography, career, or any other suitable category. This transaction data may be retrieved from a database or data storage unit, or it may be pre-loaded or pre-selected by the data collection module 120 from the outset.

The data processing module 130 may convert the transaction data into one or more dense, continuous-type vectors that are suitable for a logistic regression model. For example, the data processing module 130 may convert non-numerical transaction data such as categorical and geographical information into continuous, numeric features. This way, the transaction data is normalized and able to be used to train a model. The data processing module 130 may also preserve which transactions are fraudulent versus non-fraudulent.

Next, the oversampling module 130 can be used to change or augment the transaction data. This augmentation occurs because, in some embodiments, the transaction data is highly skewed towards non-fraudulent data. The oversampling technique is used to augment the transaction data by generating new data points rather than simply replicating them. One oversampling method is Synthetic Minority Oversampling Technique (SMOTE), which synthesizes new data points based on the distance between existing instances. When a positive sample is selected, one of its K-nearest neighbors is selected, and a new positive sample is randomly generated on the linear combination of the two samples. Other oversampling methods focus on different aspects, such as Borderline SMOTE giving more weight to borderline data, and ADASYN focusing more on hard to learn minority classes. With the advance of deep learning, oversampling also includes non-linear data oversampling, such as Generative Adversarial Networks (GANs), which generate new data based on existing training data.

As most transactions are valid, and a much smaller amount of transactions are fraudulent, this imbalance occurs. In order to train the model on a sufficient amount of fraudulent data, the over sampling module 130 may oversample the non-fraudulent transaction data. The oversampling module 130 may oversample the fraudulent transaction data to some predetermined or dynamic threshold. This oversampling may be done by an Negative-Calibrated Generative Adversarial Network (NCGAN) associated with the oversampling module 130.

A GAN consists of two neural networks: a generator and a discriminator. The generator attempts to produce data that is indistinguishable from real, authentic data so that it can fool the discriminator. The discriminator analyzes both real data and the synthetic data produced by the generator as input and attempts to distinguish between the two. The discriminator learns to make this distinction by analyzing the features of the input data and deciding whether it is more likely to be real or fake. This process continues in a loop, with both networks improving over time: the generator producing increasingly convincing fakes, and the discriminator becoming more adept at telling them apart from real data.

In an NCGAN, the generator may be calibrated so that it specifically generates synthetic data that is representative of the minority class (in this case, fraudulent transactions) while ensuring that these synthetic samples are distinct from the majority class (non-fraudulent transactions). The NCGAN network may be trained and retrained any number of times.

The adversarial response generation module 150 may model the behavior of fraudsters who may be manipulating data for the purpose of fooling the fraud detection algorithms. The adversarial response generation module 150 may include a GAN designed to model the behavior of fraudsters in their attempts to fool the machine learning models designed to catch fraudulent attacks. Although the ground-truth or real-world actions of fraudsters may be unknown, the adversarial response generation module 150 may make assumptions about the fraudster's behavior.

The adversarial response generation can be a linear combination of raw data feature and the logistic regression parameters. Logistic regression uses the weighted sum of input features plus a bias term to make predictions. If the generator in a GAN can produce samples that, when fed into the logistic regression model, result in a linear combination of features and parameters that is close to the decision boundary of the logistic regression model, then those samples will be harder to classify correctly. This is the most effective way to evade logistic regression's detection given the l2 deviation upper bound. In a training set, all fraudulent features are transformed in this way, and non-fraudulent ones remain unchanged.

In addition, the l2 deviation upper bound constraint ensures that the generated samples are not too far from the real data distribution. By constraining the l2 deviation, we're ensuring that the generated samples are close to the real data in terms of their features. This could make the generated samples look more like the real data, further helping to evade detection.

Figure 2:
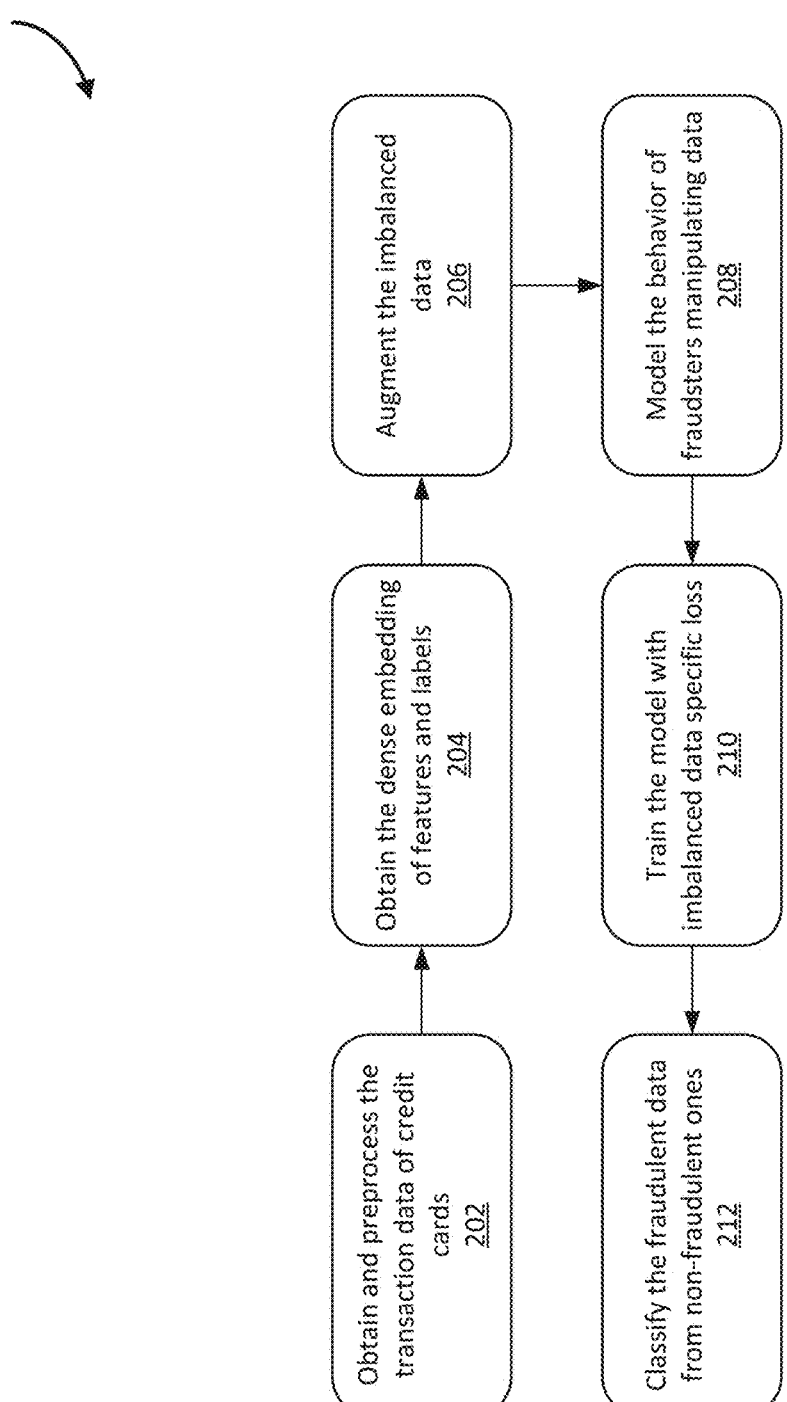
FIG. 2 is a flowchart depicting steps taken to obtain, augment, model, train, and classify data, according to some embodiments.

FIG. 2 depicts a flowchart of steps. Flowchart 200 includes six steps. Step 202 refers to obtaining the credit card transaction data and the fraudulent-or-not label for each record. A purpose-built data collector could be used for this purpose. Alternatively, parsers, clients, or block explorer services can also be used to provide this function.

Step 204 refers to converting the credit card transaction feature into dense continuous-type vectors that are suitable for a logistic regression model. The raw feature may include categorical, string and other non-numeric features. The system is configured to convert these features into continuous numeric features via some data processing techniques, such as one-hot label, word2vec, etc.

Step 206 is the data augmenting procedure. The credit card fraud detection dataset is usually highly imbalanced. The system addresses this imbalance through a sum of top-K loss method or oversampling of the input records. In step 208, the fraudulent manipulation response is modelled according to the parameters, and the response strategy (e.g., the coping strategy) is formulated as an iterative Stackelberg Game. In the training period, the system replaces the raw feature with the manipulated feature.

In Step 210, the model is trained with the model specific loss and returns the optimal logistic regression parameters.

In step 212, a linear classifier is constructed with the optimal parameters to detect fraudulent transactions in the test set.

Figure 3:
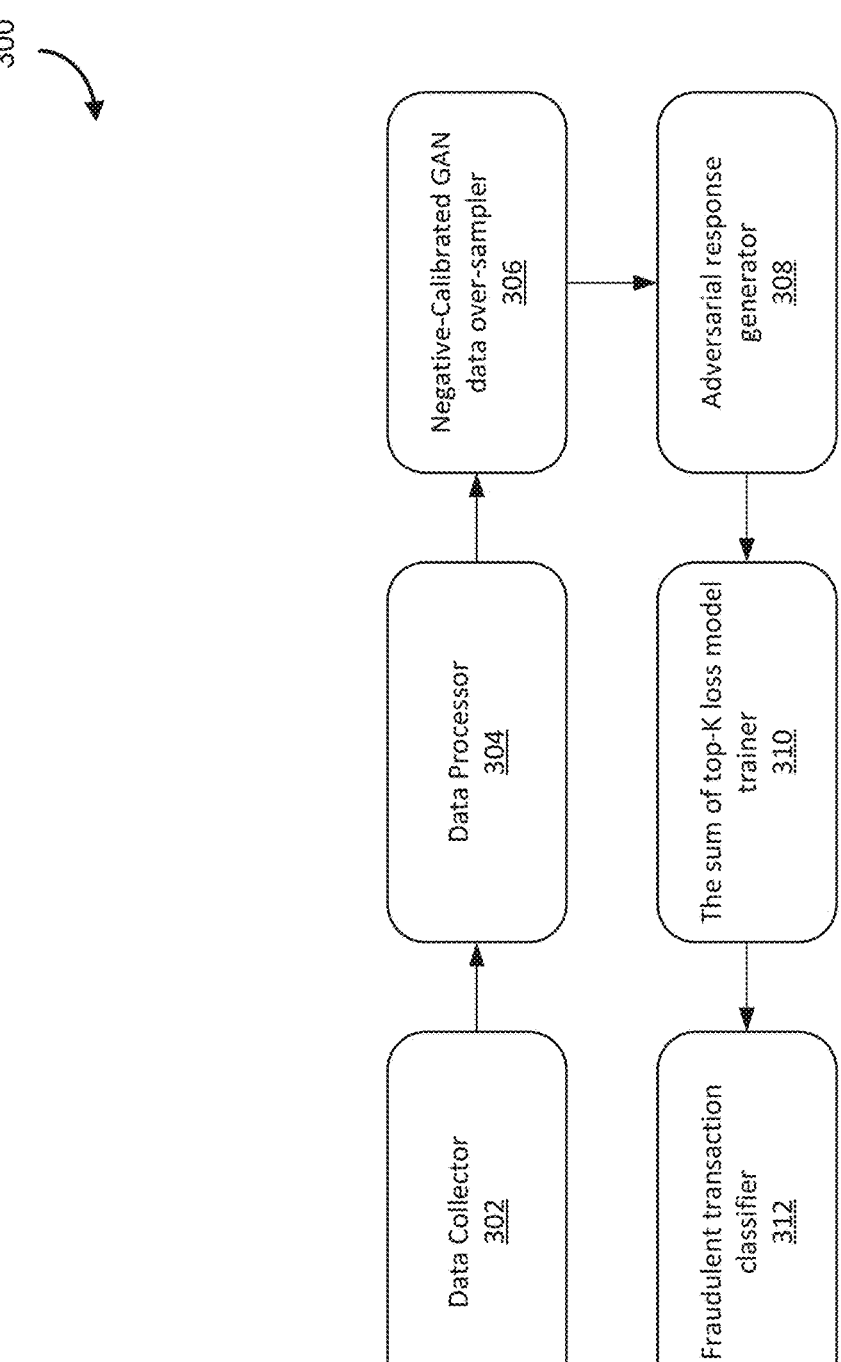
FIG. 3 depicts conceptual data modules utilized by the proposed system, according to some embodiments.

FIG. 3 depicts an example 300 of data modules. Six functional modules are included: part 302 is data collector implementing the functions in 202; 304 is a data processor described as 204; 306 is a novel NCGAN that is designed specifically for this task. Compared with the traditional GAN, NCGAN adds a discriminator network to calibrate the synthetic fraudulent data to not resemble the non-fraudulent data. 308 is the model in which the system responds based on an estimation of how the fraudster's model has manipulated data. The iterative manipulation is a linear estimation and its detailed description is in FIG. 5. 310 is the logistic regression model trainer. The optimization objective is the sum of top-K loss which is more suitable in an imbalanced data classification task; 312 is the linear classifier that determines fraudulent transaction.

As a practical example, the proposed approach could be implemented to develop a fraud detection system to identify fraudulent transactions for a financial institution (FI). The fraudsters, aware of this system, strategically plan their fraudulent activities to avoid detection. To model this situation using a Stackelberg equilibrium, the fraudsters can be assumed to act as the leader, making their decisions first, then the FI acts as the follower, responding to the fraudsters' actions.

The fraudsters consider various factors, such as transaction amount, time of day, and transaction frequency, to plan their fraudulent activities. They aim to maximize their gains while minimizing the risk of detection. The FI, aware of the fraudsters' strategies, develops a fraud detection ML model. The model is trained on historical data, including both fraudulent and legitimate transactions, to learn patterns and indicators of fraud.

The fraudsters initiate their fraudulent transactions based on their strategy. The FI's ML model analyzes these transactions and flags suspicious ones for manual review or further investigation. The FI provides feedback to the ML model, updating it with the outcomes of the reviewed transactions. This feedback helps the model improve its fraud detection capabilities over time.

Based on the FI's response and the fraudsters' observed success or failure, both parties adjust their strategies in subsequent iterations. The fraudsters may modify their tactics to bypass the ML model, while the FI may update its model to catch the evolving fraud patterns. The iterative process continues as the fraudsters and the FI adapt and counter-adapt, aiming to reach a Stackelberg equilibrium. In this equilibrium, the FI's fraud detection model becomes more effective, and the fraudsters' strategies become less successful.

The FI's fraud detection system may initially have a set of predefined rules to flag suspicious transactions. However, as fraudsters evolve their strategies, they may find ways to bypass these rules. In response, the FI can adjust the rules based on the fraudsters' tactics, adding new indicators and patterns to catch the evolving fraud. This adjustment aims to maintain the equilibrium by increasing the model's effectiveness against the fraudsters' tactics.

The ML model used for fraud detection relies on various features or variables derived from transaction data. Fraudsters may exploit certain patterns or features that are not adequately captured by the initial set of features. In the equilibrium adjustment phase, the FI can incorporate additional features that capture these exploitable patterns, making the model more robust against new fraud techniques.

Fraudsters may attempt to deceive the ML model by intentionally manipulating certain features or patterns to resemble legitimate transactions. In response, the FI can develop ensemble models that combine multiple fraud detection algorithms or techniques. By leveraging the strengths of different models, the ensemble approach can adapt to fraudsters' evolving strategies, maintaining equilibrium by improving overall detection accuracy.

Fraudsters may employ novel tactics that are not present in historical training data, making it challenging for traditional supervised learning models to detect them. In the equilibrium adjustment phase, the FI can incorporate unsupervised learning techniques, such as anomaly detection, to identify previously unseen patterns of fraud. This adjustment helps the model adapt to new and emerging fraud patterns, ensuring equilibrium is maintained.

The equilibrium adjustment is an ongoing process that requires continuous feedback. The FI continuously collects feedback on the outcomes of flagged transactions, including false positives and false negatives. This feedback loop enables the model to learn from its mistakes and make necessary adjustments to reduce false positives while maintaining a low false-negative rate. The FI can also leverage external data sources, such as industry-wide fraud trends, to further refine the model's equilibrium.

Figure 4:
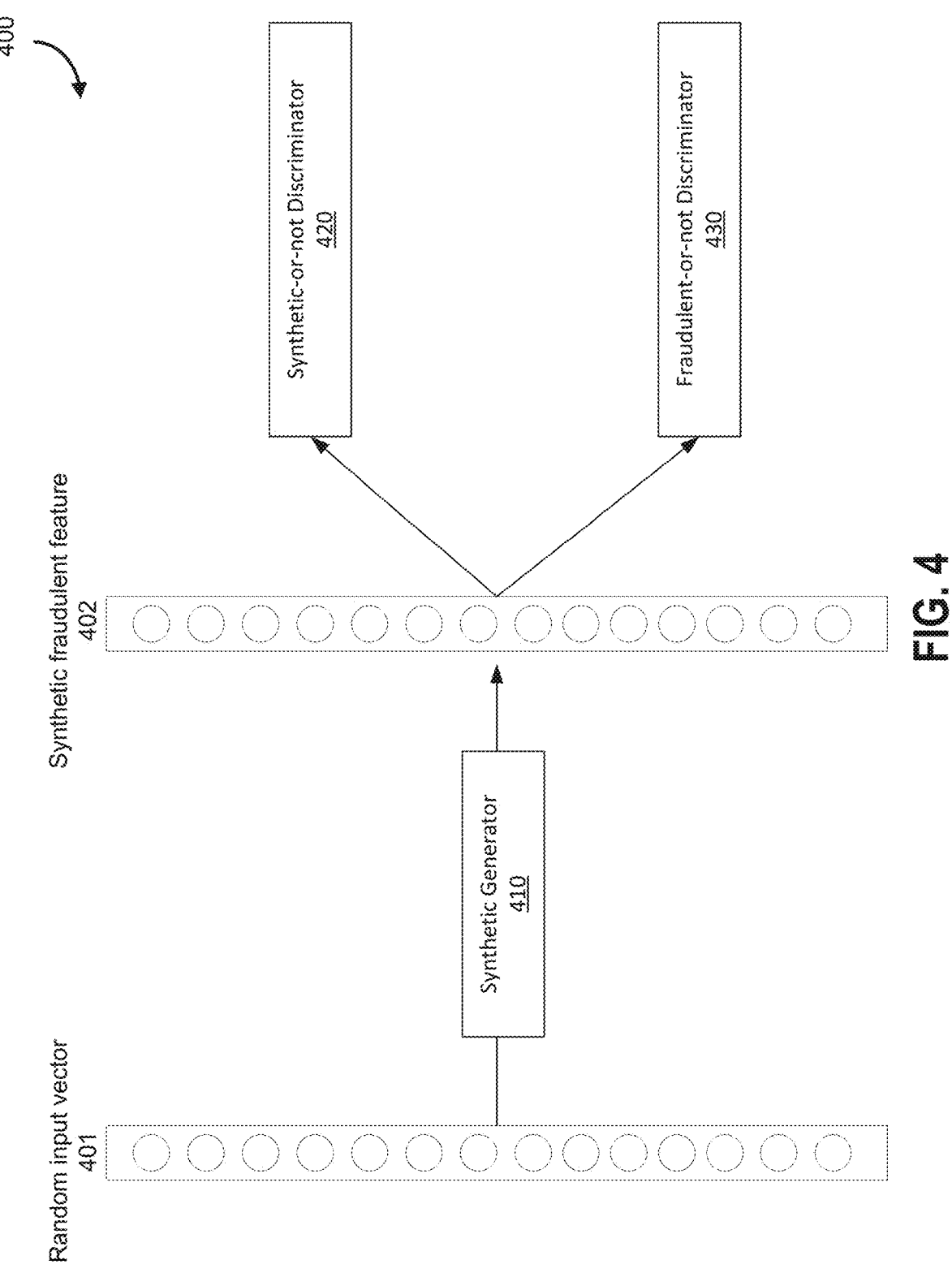
FIG. 4 depicts the Negative-Calibrated Generative Adversarial Network, according to some embodiments.

FIG. 4 depicts the NCGAN. The NCGAN data over-sampler may be an engine that has one generator network and two discriminator networks. The first discriminator differentiates real positive data from synthetic positive data, while the second discriminator differentiates positive from negative data. The generator in NCGAN aims to fool the first discriminator and to ensure that its synthetic data is classified by the second discriminator as positive. The generator takes Gaussian random vector as input and generates synthetic data. The optimization for the three neural networks of the NCGAN model involves reducing the binary cross-entropy loss between the predicted probability and true label.

Initially, the first discriminator is strong while the generator is weak. As the training progresses, the generator becomes stronger leading to a decrease in the generator loss. Simultaneously, the discriminator finds it more difficult to distinguish whether the data is synthetic or real, resulting in a rise in discriminator loss.

NCGAN enhances the handling of imbalanced data by enlarging the positive features index set. It takes random variables as input and outputs synthetic fraudulent features that do not resemble non-fraudulent ones. It uses adversarial learning to generate synthetic data that closely resembles real data. This method allows for a smaller l2 regularization when the model can correctly classify the ground truth label, but imposes a larger regularization if the adversarial adjusted positive samples are near or crossing the decision boundary. This results in the model being less sensitive to positive outliers.

The synthetic data generated by NCGAN is additionally calibrated by a classifier, which pulls the distribution of positive synthetic data away from the negative data distribution.

NCGAN is a model designed to generate synthetic data that closely resembles real data. It operates in a game-like scenario where the Synthetic Generator 410 tries to produce synthetic fraudulent feature 402 that the Synthetic-or-not Discriminator 420 classifies as real. The Synthetic-or-not Discriminator 420, on the other hand, learns from the most recent synthetic data to improve its classification accuracy.

The Synthetic Generator 410 takes random input vector 401 as input and outputs the synthetic fraudulent feature 402. In a traditional GAN, the synthetic data is only tested by the Synthetic-or-not Discriminator 420, which aims to distinguish synthetic data from non-synthetic data. The game between these two leads to the Synthetic Generator 410 generating more synthetic data. However, the synthetic fraudulent data may resemble the non-fraudulent data, thus compromising the downstream task. Applicants propose adding an additional Fraudulent-or-not Discriminator 430 to calibrate the synthetic fraudulent feature.

The Fraudulent-or-not Discriminator 430 encourages the Synthetic Generator 410 to generate synthetic data with a distribution further away from the non-fraudulent data. Therefore, the Synthetic Generator 410 in the proposed NCGAN model has a two-fold goal: firstly, it aims to fool the Synthetic-or-not Discriminator 420; and secondly, it aims to ensure that its synthetic data is classified by the Fraudulent-or-not Discriminator 430 as fraudulent data. This approach is designed to alleviate the drawback in the traditional GAN and to improve the accuracy of the fraud detection model.

NCGAN introduces a penalty term to the standard GAN for synthetic positive data that appears more like real negative data. This is a key feature of NCGAN and differentiates it from traditional GANs which may generate synthetic data that resembles negative data more than positive data, which could result in a flawed decision boundary from the logistic regression. Producing synthetic data that does not take on non-fraudulent samples' characteristics is an important consideration in making successful fraud detection classifiers. If the synthetic data produced exhibits an overwhelming bias towards non-fraudulent data, it could potentially impede the classifier's performance and lead to incorrect classifications.

Figure 5:
FIG. 5 depicts the model configuration to cope with adversarial attacks, according to some embodiments.

FIG. 5 depicts how the model is configured to cope with the adversarial attacks through modeling, according to some embodiments. Although the ground-truth manipulation of fraudsters is unknown, the approach 500 assumes that the fraudulent manipulation is changing a user-defined manipulation penalty term. For example, the approach can assumes that the fraudulent manipulation is changing x into x−w/C, where C is a user-defined manipulation penalty. This manipulation is the most effective way to evade a logistic regression's detection given the l2 deviation from the raw feature is no larger than the penalty term. In the training set, the raw fraudulent features are replaced by this transformation.

The penalty term in NCGAN is implemented to penalize synthetic positive data if it resembles a real negative sample. The essence of NCGAN is adding this penalty term to the standard GAN. This approach ensures that the synthetic data generated by the model is classified by the second discriminator as positive data, which helps to improve the accuracy of the logistic regression's decision boundary.

The connection between fraudulent manipulation and the penalty term comes from the assumption that fraudsters will attempt to manipulate their features based on the parameters of the logistic regression model used in fraud detection. Specifically, they aim to obtain a lower activation value in the model while minimizing the deviation from their original features. The penalty parameter C in the model penalizes the altering of the distribution of fraudulent data. This penalty term is used to discourage fraudsters from significantly changing their data distribution to evade detection.

In a heavily simplified example for illustration, contemplate where one is a teacher who needs to identify the students who are cheating in an exam. The cheaters' test papers are the 'real negative samples', the honest students' test papers are the 'real positive samples', and the cheaters are the 'fraudsters'. Now, suppose a few cheaters are smart and they don't copy answers directly. Instead, they rephrase the answers in their own words to avoid detection. Their test papers are the 'synthetic positive data', which resemble the honest students' papers, yet were created dishonestly. To catch these smart cheaters, a new rule or 'penalty term' can be created. If a test paper too closely resembles another student's paper, but with slight alterations to avoid direct copying, this paper would be penalized. This a very simplified analogy of the NCGAN implementation.

The 'second discriminator' is like a second teacher who specifically checks for these smart cheaters. The aim is to ensure that all the test papers marked as 'honest' are indeed honest, and not sophisticated copies. The assumption about cheaters trying to adjust their answers based on your marking pattern is similar to fraudsters adjusting their features based on the logistic regression model. They want to cheat without being caught, i.e., get a lower activation value in the model while minimizing deviation from their original answers.

Finally, the parameter C in the rule represents how harsh the penalty is for trying to change their 'cheating pattern' or data distribution. This is there to discourage the cheaters from changing their cheating strategies to evade detection.

The approach 500 can be run as an iterative process such that the system models the game between the fraudsters and data miner as a Stackelberg game. It is a sequential game in that once the logistic model is established, the fraudsters reacts to the model weight. When the model weight is optimized after some iterations, the data miner and the fraudsters achieve the Stackelberg equilibrium, meaning that considering the manipulation of fraudsters, the data miner has achieved the lowest logistic regression loss.

The loss model training module 160 may train a loss model with the imbalanced data specific loss. Generally, loss functions quantify the difference between the predicted outputs of the model and the actual ground truth labels. The goal of training is to minimize this loss, which corresponds to improving the accuracy of the model's predictions.

Figure 6:
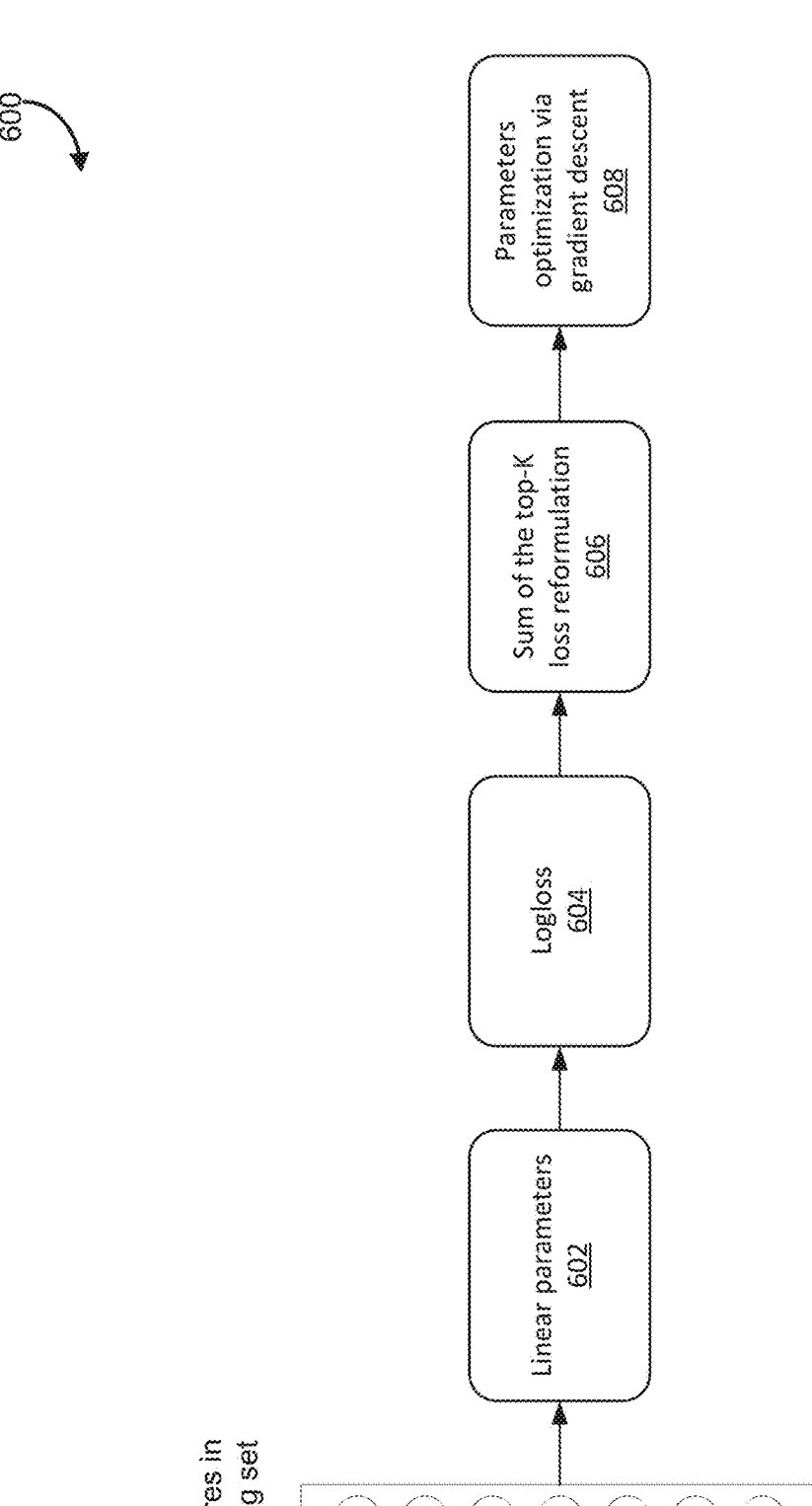
FIG. 6 depicts the parameter optimization procedure, according to some embodiments.

FIG. 6 depicts the parameter optimization procedure. With the changed fraudulent and unchanged non-fraudulent features, an inner product is calculated with the linear parameters 602, and a logloss 604 is calculated. The approach 600 does not sum every sample's logloss. Instead, the system is configured to only sum the largest K loss 606 to avoid overfitting from data imbalance.

In highly imbalanced data, most of the negative samples are far from the decision boundary, resulting in very small losses. If there are too many such unimportant samples, their loss could misguide the model. The sum of top-K loss prevents the model from being dominated by these unimportant samples and focuses on the critical samples that need more attention.

The model trainer optimizes the sum of top-K largest logloss of all samples in the training set, and a reformulation is constructed by adding an auxiliary variable. This sum of top-K loss is reformulated by introducing the auxiliary variable in 606, and a gradient descent is applied to optimize the logistic regression loss in 608. The gradient descent method 608 is used to optimize the model and output the logistic regression parameter.

The gradient descent method is a novel application of the Stackelberg game adversarial learning. A technical deficiency in prior approaches is that the model weight is solved via the first-order stationary condition. As a result, the number of dual variables grow in proportion to the sample numbers, thus becoming unscalable to large datasets.

Figure 7:
FIG. 7 depicts the final detection procedure, according to some embodiments.
Figure 7:
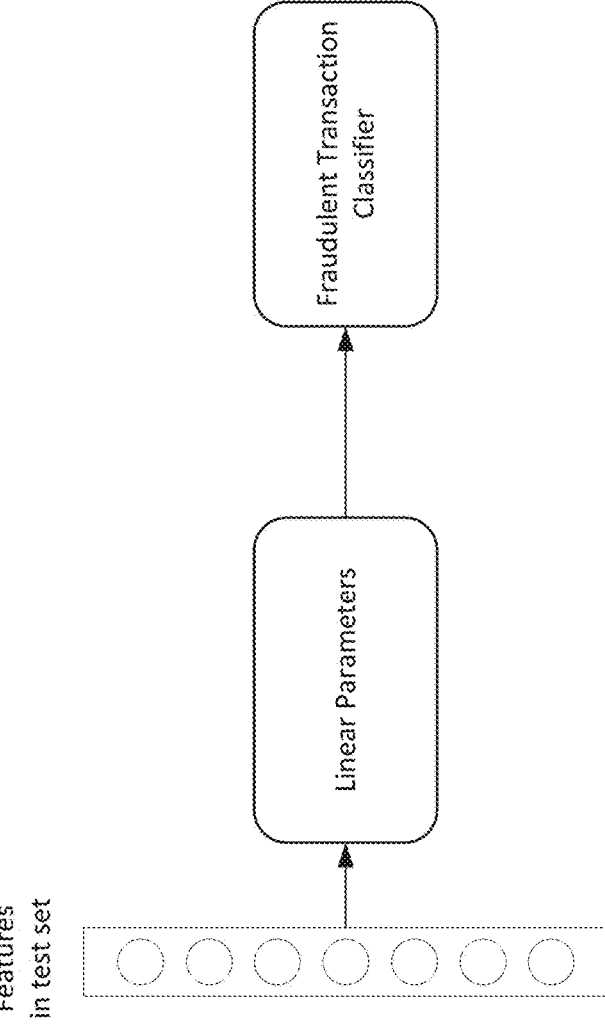

FIG. 7 depicts the final detection procedure. In the test set, no changes are made to the features. The inner product with the logistic regression parameter is compared against a threshold value to determine whether the test set is fraudulent. The threshold could be set to 0 by default or choose the threshold that maximizes the F1 score in the training set.

During operation, the inner product of feature data and the logistic regression parameter can be used to classify the fraudulent transactions. Due to the manipulation in the training dataset, this inner product would significantly exceed the threshold in case of real fraud, resulting in a more effective fraud detection system in operation. The proposed gradient descent approach herein could also be implemented in an online mechanism and is more suitable for large datasets.

Applicants conducted a numerical experiment using a dataset containing transaction features and labels (fraudulent or non-fraudulent) of European cardholders in September 2013. The dataset is highly imbalanced, with only 0.172% positive samples.

To test an embodiment of the proposed AST framework, a rolling training-testing paradigm was used, dividing the dataset chronologically into four equal-sized sub-datasets and three rounds of experiments were performed. In each round, Applicants trained the models on Training Sets and evaluated the results on Test Sets. Despite the relatively large size of the dataset, each sub-dataset was also highly imbalanced. Each sub-dataset contained 71,201 samples, with 177, 92, 129, and 94 positive samples, respectively. In each training set, Applicants implemented the ADASYN oversampling technique to augment the proportion of positive samples to 3%.

Figure 8A:
FIG. 8A, FIG. 8B, and FIG. 8C are surface plots of experimental results of F1 scores at different values of C and K for three test sets.
Figure 8A:
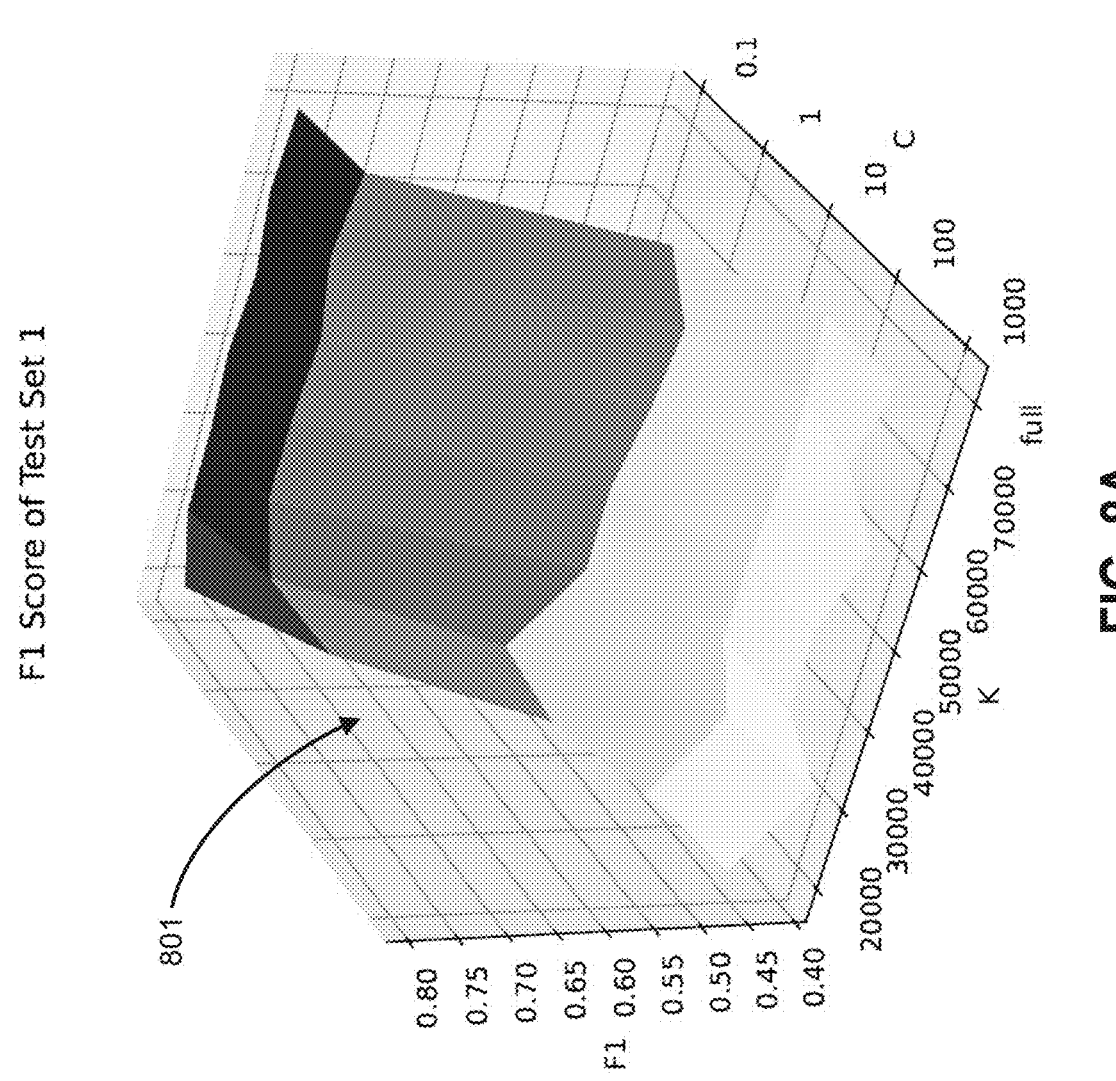
Figure 8B:
Figure 8C:
Figure 8C:
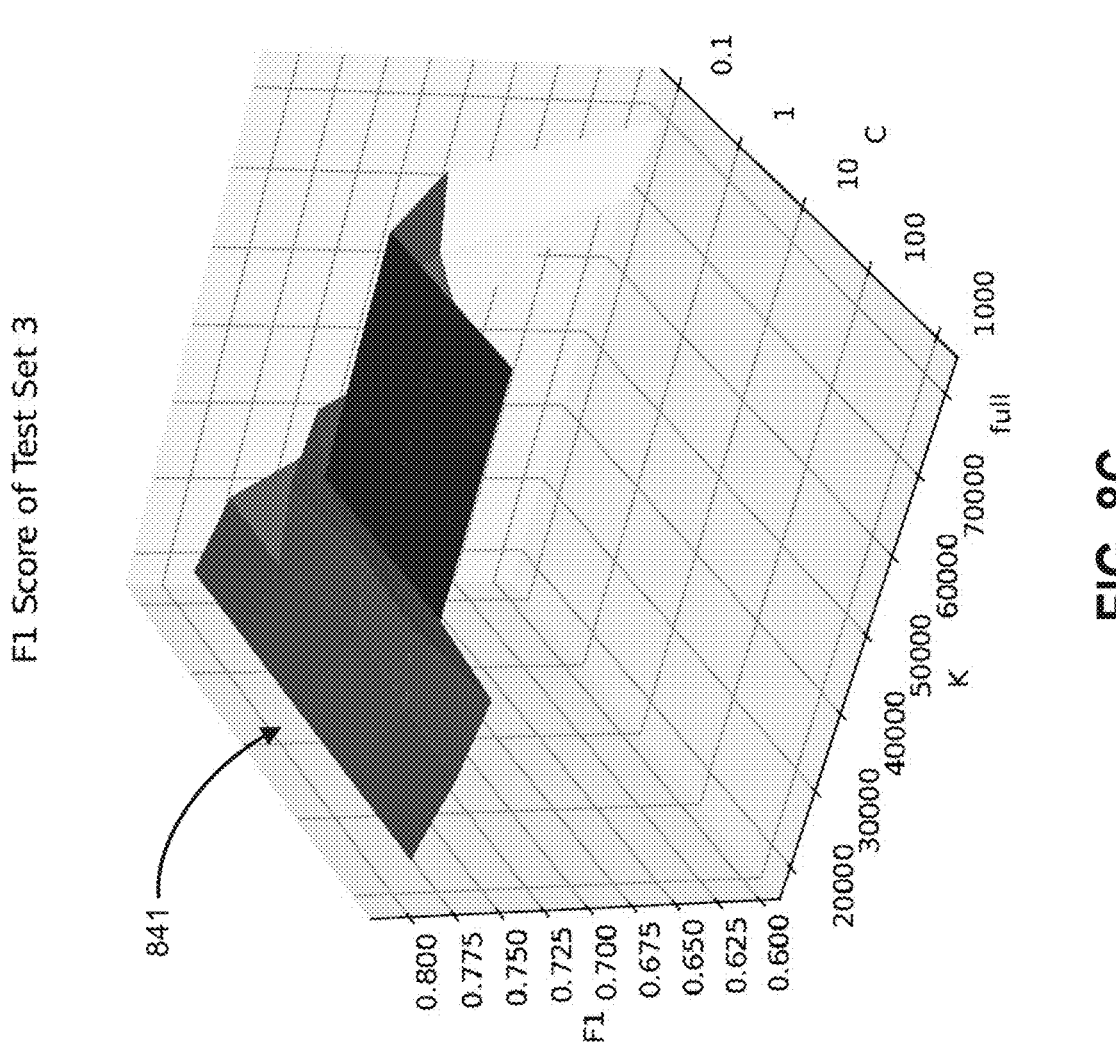

Applicants tested different parameters of the adversarial penalty C in equation (1) and the top K value in equation (8). The C values ranged from 0.1 to 1000, and the K values ranged from 20,000 to the full dataset. In FIG. 8A, FIG. 8B, and FIG. 8C, Applicants plotted the surface of F1 scores for different parameters. FIG. 8A, FIG. 8B, and FIG. 8C show surfaces 801, 821, and 841 for Test Sets 1, 2, and 3, respectively.

In all three experiments, choosing a smaller C=0.1 and K=20,000 yielded a relatively high F1 score, which proved the robustness of the framework. Adversarial learning played a crucial role in experiments 1 and 2.

With C increasing, the F1 score in Test Set 1 quickly deteriorated and even vanished in Test Set 2, except when the adversarial move by fraudsters (i.e. C=0.1) was considered, allowing linear models to be predictive in these two scenarios. Moreover, choosing a smaller K was more robust. When fixing C, a smaller K always yielded a favorable result.

Figure 9A:
FIG. 9A, FIG. 9B, and FIG. 9C are plots of area under the receiver operating characteristics curve corresponding to three test sets.
Figure 9B:
Figure 9C:

The Area Under the Receiver Operating Characteristics Curve (AUC-ROC) surface is depicted in FIG. 9A, FIG. 9B, and FIG. 9C. FIG. 9A, FIG. 9B, and FIG. 9C show surfaces 901, 921, and 941 for Test Sets 1, 2, and 3, respectively.

In particular, Applicants observe that in Test Set 2, the AUC-ROC remained high (>0.86) even when the F1 score was very low. This is due to the fact that AUC-ROC is a measure of the model's ability to rank true positive instances higher than false positive instances across all possible decision thresholds, whereas the F1 score is a measure of the model's ability to balance precision and recall for a particular decision threshold, which is fixed at 0.5 in the experiment. Therefore, the F1 score is the subject of focus in the analysis as it provides more insight into the model's predictive power in practice.

Applicants compared the performance of the proposed AST framework with three kinds of baselines: logistic regression, the state-of-the-art TabNet and the adversarial learning model (SPG-Linear).

Logistic regression is a simple linear model that is widely used for binary classification problems. However, it assumes a linear decision boundary, which might not hold true in complex and nonlinear fraud detection scenarios. It can also be sensitive to feature scaling and outliers. On the other hand, the AST model integrates adversarial learning, which can help to mitigate the limitations of logistic regression by introducing an adversarial perspective. This can make the model more robust to feature manipulation and improve its ability to generalize from the training data to actual fraudulent activities.

TabNet is a state-of-the-art model that uses deep learning for tabular data. While it can capture complex interactions between features, it might not be as robust to adversarial attacks or feature manipulation as the AST model. Adversarial learning in AST can help to identify and mitigate these potential vulnerabilities by modeling the behavior of fraudsters who might be trying to evade detection. Additionally, TabNet might struggle with the imbalanced data common in fraud detection. The sum of top-K loss in AST can improve the robustness of classification under imbalanced data.

SPG-Linear is an adversarial learning model that uses a linear function to model the data. While it also introduces an adversarial perspective, it might not perform as well as the AST model for a few reasons. First, much like logistic regression, it might struggle with complex, nonlinear decision boundaries. Second, it uses plain empirical loss, which might not be as effective for imbalanced data as the sum of top-K loss used in the AST model.

The experimental results reflect the AST's theoretical superiority in practice and are summarized in Table I. Applicants observe that AST outperforms all other models in terms of F1 scores in all three test sets. In particular, AST achieves high precision in Test Set 2 while the other two non-adversarial models perform poorly in this metric. Overall, based on the strong performance of AST in accuracy, precision, recall, and F1 score, Applicants conclude that the AST provides a practical and a robust classification framework for credit card fraud detection.

TABLE I

DIFFERENT MODELS PERFORMANCE IN TEST SETS

| Test Set | Model | Accuracy | Precision | Recall | F1 Score | AUC-ROC |
|---|---|---|---|---|---|---|
| Test Set 1 | Logistic | 0.9948 | 0.3168 | 0.3478 | 0.3316 | 0.8774 |
| | TabNet | 0.9994 | 0.9180 | 0.6086 | 0.7320 | 0.9395 |
| | SPG-Linear | 0.9994 | 0.8049 | 0.7174 | 0.7586 | 0.8731 |
| | AST | 0.9995 | 0.9558 | 0.7065 | 0.8125 | 0.9274 |
| Test Set 2 | Logistic | 0.8578 | 0.0091 | 0.7209 | 0.0180 | 0.8092 |
| | TabNet | 0.9951 | 0.2436 | 0.8062 | 0.3741 | 0.9304 |
| | SPG-Linear | 0.9975 | 0.4052 | 0.8450 | 0.5477 | 0.9277 |
| | AST | 0.9994 | 0.8677 | 0.8139 | 0.8400 | 0.9481 |
| Test Set 3 | Logistic | 0.9988 | 0.5581 | 0.7659 | 0.6457 | 0.9231 |
| | TabNet | 0.9995 | 0.9067 | 0.7234 | 0.8047 | 0.9316 |
| | SPG-Linear | 0.9994 | 0.9355 | 0.6170 | 0.7436 | 0.8557 |
| | AST | 0.9995 | 0.8875 | 0.7553 | 0.8160 | 0.8813 |

Various embodiments have been described with references to the accompanying drawings. It may, however, be evident that various modifications and changes may be made thereto, and additional embodiments may be implemented, without departing from the broader scope as set forth in the claims that follow. The description and drawings are accordingly to be regarded in an illustrative rather than in a restrictive sense.

The embodiments are not to be limited in terms of the particular embodiments described herein, which are intended as illustrations of various aspects. Many modifications and variations can be made without departing from its spirit and scope. Functionally equivalent systems, processes and apparatuses within the scope of the invention, in addition to those enumerated herein, may be apparent from the representative descriptions herein. Such modifications and variations are intended to fall within the scope of the appended claims. The proposed approach is to be limited only by the terms of the appended claims, along with the full scope of equivalents to which such representative claims are entitled.

The preceding description of exemplary embodiments provides non-limiting representative examples referencing numerals to particularly describe features and teachings of different aspects of the invention. The embodiments described should be recognized as capable of implementation separately, or in combination, with other embodiments from the description of the embodiments. A person of ordinary skill in the art reviewing the description of embodiments should be able to learn and understand the different described aspects. The description of embodiments should facilitate understanding to such an extent that other implementations, not specifically covered but within the knowledge of a person of skill in the art having read the description of embodiments.

We claim:

1. A computer implemented system for hardening a machine learning model used for detecting credit card fraud, comprising:

a memory configured to store transaction data associated with credit card usage, wherein the transaction data includes a plurality of transaction features and a fraud indicator for each transaction; and a processor communicatively coupled to the memory, the processor being configured to:

preprocess the transaction data to transform the plurality of transaction features into dense continuous-type numeric vectors for logistic regression analysis;

augment the transaction data to address data imbalance between fraudulent and non-fraudulent transactions by employing a Negative Calibrated Generative Adversarial Network (NCGAN) that generates synthetic fraudulent transaction data distinct from non-fraudulent transaction data;

model adversarial behavior of fraudsters by adjusting features of fraudulent transactions in the augmented transaction data based, at least in part, on parameters of a logistic regression model, wherein the adjustment simulates a response to the logistic regression model in accordance with a simulated Stackelberg game;

train the logistic regression model using a sum of top-K loss function that prioritizes a subset of the transaction data associated with a greatest loss to refine the parameters of the logistic regression model; and classify transactions as fraudulent or non-fraudulent in a test dataset based, at least in part, on the refined parameters of the logistic regression model.

2. The system of claim 1, wherein the memory maintains a processing structure including code execution modules providing a data collector engine, a data processor engine, a Negative-Calibrated GAN (NCGAN) data over-sampler engine, an adversarial response generator engine, a sum of top-K loss model trainer engine, and a final fraudulent transaction classifier engine.

3. The system of claim 2, wherein the NCGAN data over-sampler engine includes one generator network and two discriminator networks and is configured to receive random variables as input and output synthetic fraudulent features that do not resemble non-fraudulent features.

4. The system of claim 3, wherein the adversarial response generator engine is configured to utilize a linear combination of raw data feature and the logistic regression parameters, providing a mechanism to evade a logistic regression detection given a l2 deviation upper bound, where in a training data set, all fraudulent features are transformed, and non-fraudulent features remain unchanged.

5. The system of claim 2, wherein the sum of top-K loss model trainer is configured for optimizing the sum of top-K largest logloss of all samples in a training data set, and a reformulation is constructed adding an auxiliary variable; and wherein a gradient descent method is used to optimize the model and output the logistic regression parameter.

6. The system of claim 1, wherein an inner product of feature data and a logistic regression parameter is used to classify transactions.

7. The system of claim 1, wherein the processor is further configured to generate an output data structure representing the logistic regression model after retraining.

8. The system of claim 7, wherein the processor is further configured to periodically update the output data structure by periodically retraining the logistic regression model.

9. The system of claim 7, wherein the system is a special purpose computing appliance residing in a data center, coupled to a message bus for receiving a logistic regression model for retraining, and providing the output data structure for re-deployment after retraining.

10. The system of claim 1, wherein the processor is further configured to parse a distribution in a training data set to identify a dataset imbalance condition, and upon the dataset imbalance condition being greater than a pre-defined threshold, flag a logistic regression model for retraining.

11. A method for detecting credit card fraud in a computing environment, comprising:

obtaining transaction data associated with credit card usage, wherein the transaction data includes a plurality of transaction features and a fraud indicator for each transaction;

preprocessing the transaction data to transform the plurality of transaction features into dense continuous-type numeric vectors suitable for logistic regression analysis;

augmenting the transaction data to address data imbalance between fraudulent and non-fraudulent transactions by employing a Negative-Calibrated Generative Adversarial Network (NCGAN) that generates synthetic fraudulent transaction data distinct from non-fraudulent transaction data;

modeling adversarial behavior of fraudsters by adjusting features of fraudulent transactions in the augmented transaction data based, at least in part, on parameters of a logistic regression model, wherein the adjustment simulates a response to the logistic regression model in accordance with a simulated Stackelberg game;

training the logistic regression model using a sum of top-K loss function that prioritizes a subset of transaction data associated with a greatest loss to refine the parameters of the logistic regression model; and classifying transactions as fraudulent or non-fraudulent in a test dataset based, at least in part, on the refined parameters of the logistic regression model.

12. The method of claim 11, wherein the memory maintains a processing structure including code execution modules providing a data collector engine, a data processor engine, a Negative-Calibrated GAN (NCGAN) data over-sampler engine, an adversarial response generator engine, a sum of top-K loss model trainer engine, and a final fraudulent transaction classifier engine.

13. The method of claim 12, wherein the NCGAN data over-sampler engine includes one generator network and two discriminator networks and is configured to receive random variables as input and output synthetic fraudulent features that do not resemble non-fraudulent features.

14. The method of claim 13, wherein the adversarial response generator engine is configured to utilize a linear combination of raw data feature and the logistic regression parameters, providing a mechanism to evade a logistic regression detection given a $l2$ deviation upper bound, where in a training data set, all fraudulent features are transformed, and non-fraudulent features remain unchanged.

15. The method of claim 12, wherein the sum of top-K loss model trainer is configured for optimizing the sum of top-K largest logloss of all samples in a training data set, and a reformulation is constructed adding an auxiliary variable; and wherein a gradient descent method is used to optimize the model and output the logistic regression parameter.

16. The method of claim 11, wherein an inner product of feature data and a logistic regression parameter is used to classify transactions.

17. The method of claim 11, further comprising generating an output data structure representing the logistic regression model after retraining.

18. The method of claim 17, further comprising periodically updating the output data structure by periodically retraining the logistic regression model.

19. The method of claim 11, further comprising parsing a distribution in a training data set to identify a dataset imbalance condition, and upon the dataset imbalance condition being greater than a pre-defined threshold, flag a logistic regression model for retraining.

20. A non-transitory computer readable medium containing computer executable instructions that, when executed by a computer processor, cause the computer processor to perform operations, comprising:

obtaining transaction data associated with credit card usage, wherein the transaction data includes a plurality of transaction features and a fraud indicator for each transaction;

preprocessing the transaction data to transform the plurality of transaction features into dense continuous-type numeric vectors suitable for logistic regression analysis;

augmenting the transaction data to address data imbalance between fraudulent and non-fraudulent transactions by employing a Negative-Calibrated Generative Adversarial Network (NCGAN) that generates synthetic fraudulent transaction data distinct from non-fraudulent transaction data;

modeling adversarial behavior of fraudsters by adjusting features of fraudulent transactions in the augmented transaction data based, at least in part, on parameters of a logistic regression model, wherein the adjustment simulates a response to the logistic regression model in accordance with a simulated Stackelberg game;

training the logistic regression model using a sum of top-K loss function that prioritizes a subset of the transaction data associated with a greatest loss to refine the parameters of the logistic regression model; and transactions as fraudulent or non-fraudulent in a test dataset based, at least in part, on the refined parameters of the logistic regression model.

* * * * *